UNITED STATES PATENT OFFICE.

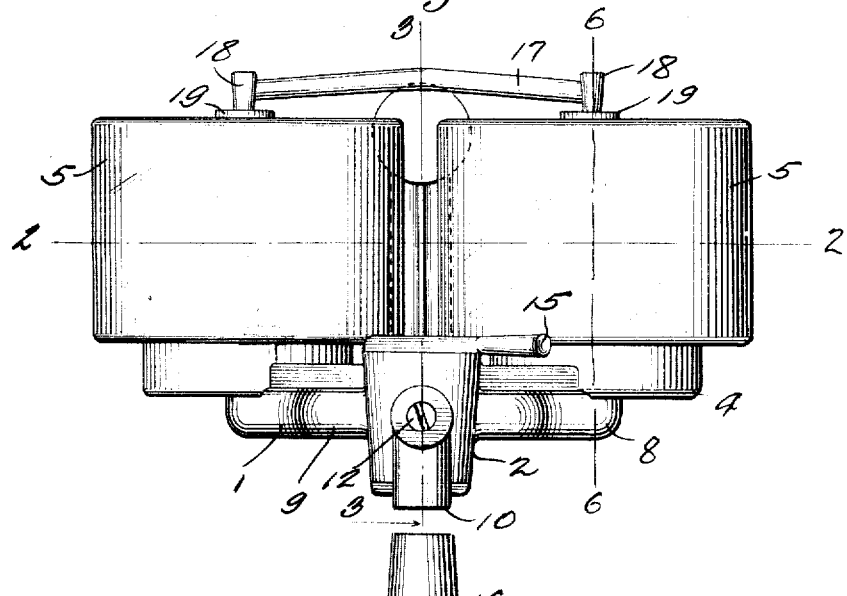
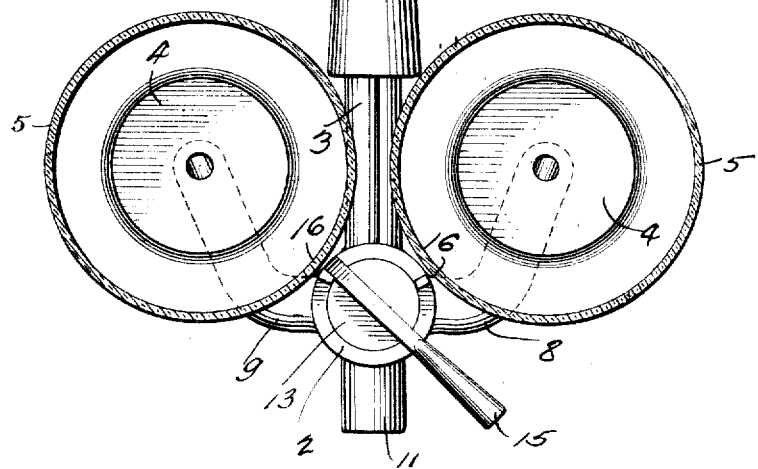

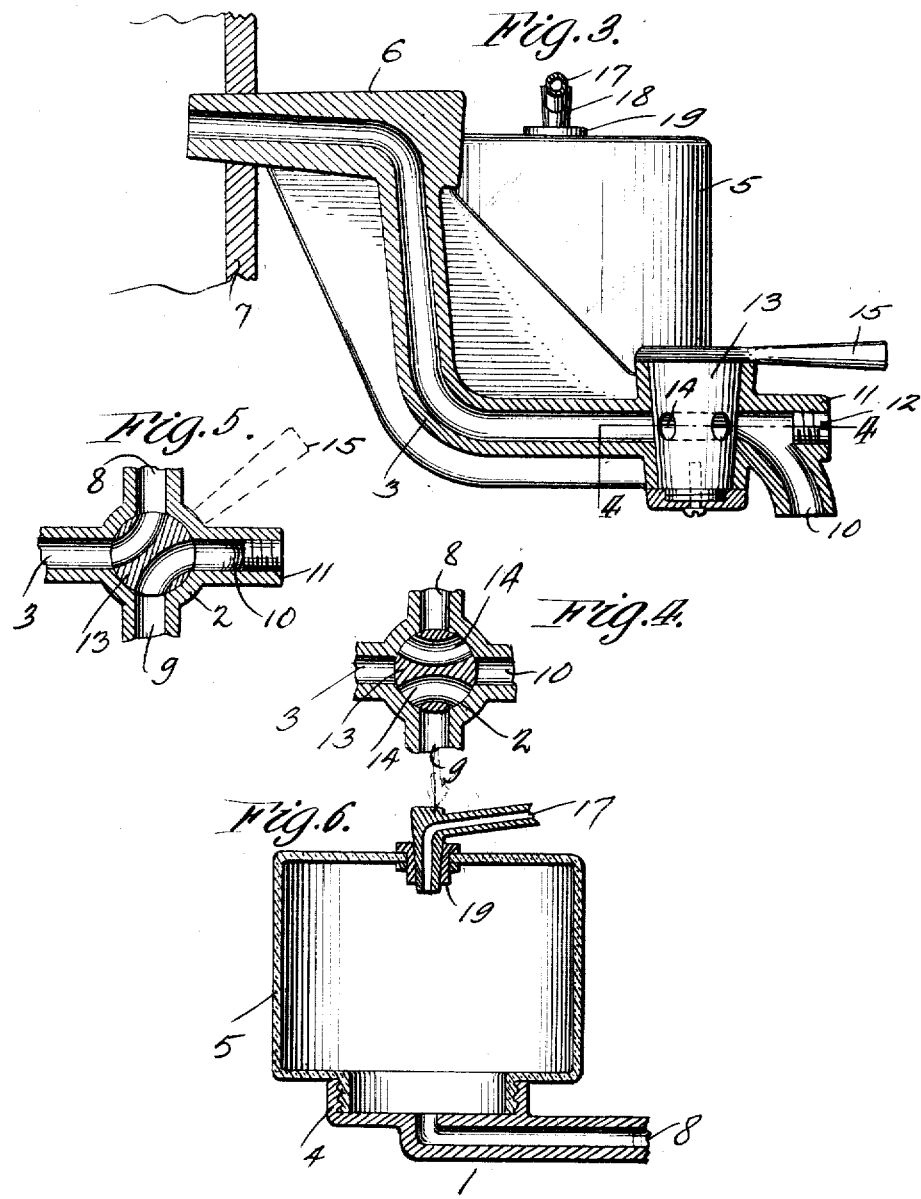

JOHN W. JOHNSON, OF WATERVILLE, KANSAS.

MEASURING-FAUCET.

1,309,688.   Specification of Letters Patent.   Patented July 15, 1919.

Application filed November 29, 1918. Serial No. 264,674.

*To all whom it may concern:*

Be it known that I, JOHN W. JOHNSON, a citizen of the United States, residing at Waterville, in the county of Marshall and State of Kansas, have invented certain new and useful Improvements in Measuring-Faucets, of which the following is a specification.

The invention provides a simple and effective device for drawing off the liquid contents of a barrel or other container in measured quantities, whereby to facilitate the emptying of the barrel and to render the operation sanitary and capable of being conducted without waste or the liability of the liquid being contaminated by insects, dust or other foreign matter.

The invention consists of a faucet embodying a plurality of measuring chambers, the parts being so arranged that when one chamber is discharging its contents, another chamber is filling, thereby saving time since it is not necessary to wait for the measuring chamber to fill before a measured quantity of liquid can be obtained, hence the operation may be practically continuous as it is necessary only to shift from one measuring chamber to the other, the discharge being practically uninterrupted.

The drawing illustrates a preferred embodiment of the invention, however, it is to be understood that in adapting the same to meet different conditions, various changes in the form, proportion, and minor details of construction may be resorted to without departing from the nature of the invention as claimed hereinafter.

Referring to the accompanying drawings:—

Figure 1 is a front view of a measuring faucet embodying the invention.

Fig. 2 is a horizontal section on the line 2—2 of Fig. 1.

Fig. 3 is a vertical longitudinal section on the line 3—3 of Fig. 1.

Fig. 4 is a sectional detail on the line 4—4 of Fig. 3 showing the position of the plug valve when the discharge is cut off.

Fig. 5 is a view similar to Fig. 4 showing the valve plug occupying a position to admit of one measuring chamber discharging and the other measuring chamber filling.

Fig. 6 is a vertical central section of one of the measuring chambers and a portion of the body about on the line 6—6 of Fig. 1.

Corresponding and like parts are referred to in the following description and indicated in all the views of the drawings by like reference characters.

The body of the faucet may be of any material and comprises a base 1, a valve casing 2 and a conduit 3. These several parts are preferably of integral formation. The base portion 1 is provided with cap portions 4 which are internally threaded to receive the threaded necks of receptacles 5 which constitute the measuring chambers. In this manner the receptacles 5 are made interchangeable, thereby adapting a single faucet for measuring different quantities or amounts. Moreover the construction is such as to admit of the measuring chambers being readily replaced.

The conduit 3 is in communication with the valve casing 2 and terminates in a plug 6 which is adapted to be fitted into an opening formed in the barrel 7 or other container holding the liquid to be drawn off in measured quantities. The plug end 6 of the conduit is disposed at a higher level than the valve casing and about in line with the tops of the measuring chambers so as to insure the proper filling of the latter. Passageways connect the valve casing 2 with the measuring chambers and are formed in the base portions 1 of the faucet body. These passageways are indicated at 8 and 9. A nozzle 10 likewise leads from the valve casing 2. A hollow extension 11 is formed with the nozzle 10 and is threaded to receive a plug 12 by means of which its outer end is closed. When the plug 12 is removed provision is had for cleaning the valve by introducing a suitable cleaner into the tubular extension as will be readily understood. The passageways 8 and 9 constitute conduits which lead into the respective caps 4 as shown most clearly in Fig. 6.

A plug valve 13 is fitted into the valve casing 2 and is provided with two curved openings 14 which are disposed in the same horizontal plane. The openings 14 are adapted to register with the several outlets or conduits in communication with the valve casing 2. The plug valve 13 is adapted to be operated by means of a handle 15 and is limited in its movements by means of stops 16 formed on the upper edge of the valve casing 2. When the valve is moved so that the handle 15 occupies a position midway between the stops 16 the openings 14 are out of register with the openings of the valve casing and the discharge of the liquid from the faucet is cut off. Likewise communication between the barrel or container 7 and the measuring chambers is cut off. When the valve 13 is moved to the limit determined by the stops 16 in either direction communication is established between one of the chambers and the barrel or container 7 and communication is established between the remaining measuring chamber and the nozzle 10, so that one of the measuring chambers may be receiving a supply while the other measuring chamber is at the same time delivering the measured quantity previously supplied thereto. Fig. 5 shows the position of the valve plug 13 when one of the openings 14 connects the passageways or conduits 3 and 8 and when the remaining openings 14 connect the passageways or conduits 9 and 10, hence it will be readily understood that one measuring chamber receives a supply from the container 7 and at the same time the other measuring chamber is delivering the charge previously supplied thereto.

In order that the measuring chambers may operate successfully it is necessary to make provision for air displacement and this is obtained by means of an air pipe 17 which connects the top of the measuring chambers so that the air may pass from one chamber to the other. In this manner the air displaced from the measuring chamber receiving a supply is admitted into the measuring chamber discharging its contents and vice versa. The air pipe 17 is provided at its end with tapered plugs 18 which are adapted to be pressed into bushings 19 fitted into the tops of the measuring receptacles or chambers 5 as indicated most clearly in Fig. 6.

In order that the faucet present a symmetrical appearance the measuring chambers are disposed upon opposite sides of the conduit 3 a like distance and it is preferred to have the measuring chambers of like capacity so that a single faucet will measure like quantities. It will be understood that the liquid contents is drawn from the barrel or container without necessitating the use of the ordinary measure and that there is no chance for the liquid being contaminated by any foreign matter since it passes directly from the barrel or container 7 through the faucet into the vessel provided to receive the measured quantity.

The foregoing description and the drawings have reference to what may be considered the preferred, or approved, form of my invention. It is to be understood that I may make such changes in construction and arrangement and combination of parts, materials, dimensions, et cetera, as may prove expedient and fall within the scope of the appended claim.

Having thus fully described my invention, what I claim as new and desire to secure by Letters Patent is:—

A measuring faucet, comprising a valve casing, a nozzle, and a conduit projecting from opposite sides of the valve casing, the nozzle extending forwardly and downwardly and the conduit projecting rearwardly and upwardly and terminating in a plug, other conduits extending laterally and rearwardly from the valve casing and terminating in caps in the rear of the valve casing and at the sides of the middle conduit, a plug valve fitting the valve casing and having curved openings to register with the nozzle and conduits, closed measuring chambers detachably fitted to the said caps and an air connection between the upper ends of the measuring chambers.

In testimony whereof I affix my signature in presence of two witnesses.

JOHN W. JOHNSON.

Witnesses:
J. C. JOHNSON,
J. W. THOMPSON.